J. D. HOUCK.
COFFEE PERCOLATOR.
APPLICATION FILED NOV. 25, 1907.
919,583.
Patented Apr. 27, 1909.
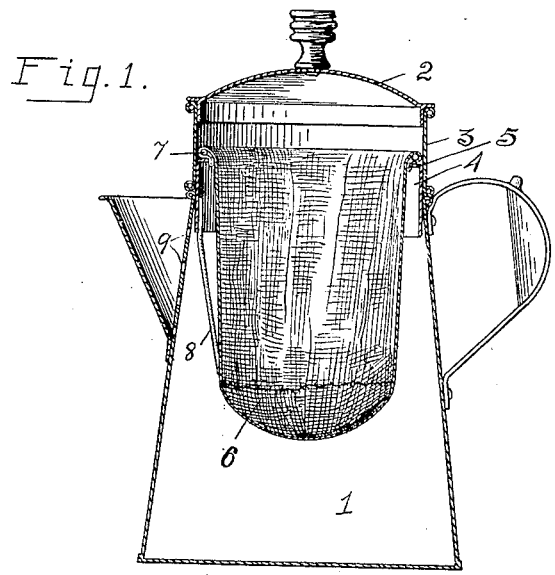
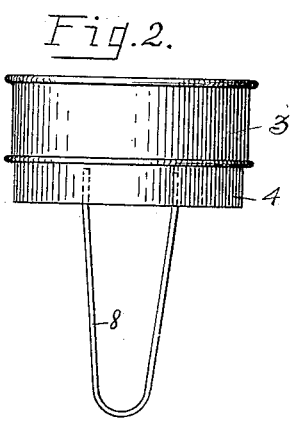
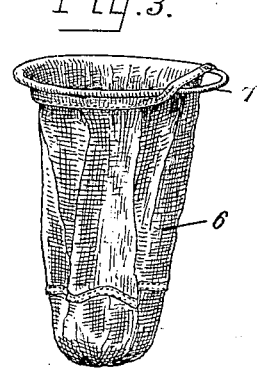
WITNESSES:
D. C. Walter
Hazel B. Hiatt
INVENTOR.
John D. Houck
By Owen & Owen
His attys.
THE NORRIS PETERS CO., WASHINGTON, D. C.

UNITED STATES PATENT OFFICE.

JOHN D. HOUCK, OF TOLEDO, OHIO.

COFFEE-PERCOLATOR.

No. 919,583.  Specification of Letters Patent.  Patented April 27, 1909.

Application filed November 25, 1907. Serial No. 403,807.

*To all whom it may concern:*

Be it known that I, JOHN D. HOUCK, a citizen of the United States, and a resident of Toledo, in the county of Lucas and State of Ohio, have invented a certain new and useful Coffee-Percolator; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to devices for use in connection with coffee-pots, coffee urns, or the like, for holding and filtering coffee while boiling or during the passage or percolation of boiling water therethrough.

The object of my invention is the provision of a simple, cheap and highly efficient device, the coffee-carrying sack or percolating chamber of which is easily suspended within or removed from a coffee-pot or the like, made of light, pliant material and has its mouth or receiving end, when in use, held open by a removable ring or frame member, thus adapting the used sack to be readily washed or substituted by a new one.

Further objects of the invention will be apparent from the following description.

The operation, construction and arrangement of the parts of my invention are fully described in the following specification, and illustrated in the accompanying drawings, in which,—

Figure 1 is a central vertical section of a coffee-pot equipped with my invention. Fig. 2 is a side elevation of the removable member from which the coffee-sack or chamber is suspended within a pot, and Fig. 3 is a similar view of the coffee-sack or chamber with its upper end or mouth portion partly disengaged from its mouth-expanding member.

Referring to the drawings, 1 designates a coffee-pot of the usual or any suitable construction, or it may be an urn or other fluid receptacle, and 2 the usual cover therefor.

3 designates an open ended shell which is fashioned to conform to the shape and size of the opening in the top of the coffee-pot. The lower portion of this member is either contracted or provided with a projecting bushing-part 4, which is adapted to fit snugly within the coffee-pot opening, as shown. The member 4 is provided with an annular internal shoulder or flange 5, which is intended to form a supporting ledge for the suspended coffee-sack or chamber 6, as hereinafter described. When the member 3 is positioned in the top of the coffee-pot its top is closed by the coffee-pot cover 2, as shown. It is thus apparent that the member 3 forms a removable crown-extension part for the coffee-pot, and has its top closed by the coffee-pot cover.

The coffee-sack or chamber 6, which is made of cloth or other suitable light porous material of a pliant nature, has its top maintained in open position by a ring or frame member 7, which is suitably shaped to adapt it to fit within the member 3 and rest upon the ledge or flange 5 therein. The ring or member 7 is removably secured to the sack top either by folding the upper portion of the sack upon itself over the ring, as shown in Figs. 1 and 3, or by placing the ring or member 7 within the upper end of the sack and then pushing the closed end of the sack through the ring so that the sack is turned inside out, thus accomplishing the same result in a slightly different way. Secured to and depending from the member 4 is a rigid tongue 8, which is intended to stand intermediate the sack or chamber 6 and the pouring openings 9 in the pot to serve as a guard for holding the sack away from such openings should the pot be tilted for pouring when the percolating device is positioned therein.

In the use of my invention, the member 3 is positioned in the open top of the pot and the sack 6, with the proper amount of coffee therein, dropped through the member 3 and lowered into the pot until the ring or member 7 comes in contact with and rests on the ledge or annular flange 5 at the upper end of the bushing 4. After boiling water is poured into the sack, the cover 2 is placed on the top of the member 3 to close its opening. The coffee being prepared, it can either be poured without first removing the sack 6 and member 3 from the pot, the tongue 8 serving as a guard to prevent the sack from falling against and closing the pouring openings 9 in the pot in such case, or the percolating parts can be removed from the pot before pouring, and the cover 2 positioned in the pot opening in the usual manner. When the strength has been taken from the coffee the sack is emptied of the grounds and the ring or frame member 7 removed from engagement with its mouth to enable the sack to be washed or a new one substituted therefor, thus materially enhancing the sanitary and commercial value of the percolator.

While I have shown and described a particular arrangement and construction of the parts of my invention, I wish it understood that I do not restrict myself to such arrangement or construction, as obvious modifications will occur to persons skilled in the art.

Having thus described my invention, what I claim as new and desire to secure by Letters Patent, is,—

The combination with the body portion of a coffee pot, an open ended shell resting upon the rim of the pot, a bushing telescoping within and fastened to said shell and snugly fitting within the upper end of the pot, said bushing having an annular inwardly turned flange at its upper end, a wire guard fastened to said bushing and projecting below the same, a bag, and a ring engaging the latter and holding the same against the inner surface of said open ended shell and upon said flange, as set forth.

In testimony whereof I have hereunto signed my name to this specification in the presence of two subscribing witnesses.

JOHN D. HOUCK.

Witnesses:
C. W. OWEN,
HAZEL B. HIETT.